(12) United States Patent
Cabral (10) Patent No.: US 7,530,402 B2
(45) Date of Patent: May 12, 2009

(54) WATER COLUMN SUPERVISORY SWITCH

(75) Inventor: Michael F. Cabral, Wildwood, MO (US)

(73) Assignee: Potter Electric Signal Company, LLC, St. Louis, MO (US)

( * ) Notice: Subject to any disclaimer, the term of this patent is extended or adjusted under 35 U.S.C. 154(b) by 406 days.

(21) Appl. No.: 11/418,777

(22) Filed: May 6, 2006

(65) Prior Publication Data
US 2006/0260822 A1 Nov. 23, 2006

Related U.S. Application Data

(60) Provisional application No. 60/678,853, filed on May 6, 2005.

(51) Int. Cl.
*A62C 35/00* (2006.01)
*A62C 37/36* (2006.01)
*A62C 35/60* (2006.01)
*A62C 3/06* (2006.01)
*A62C 37/00* (2006.01)

(52) U.S. Cl. .............................. 169/17; 169/19; 169/20; 169/23; 169/56

(58) Field of Classification Search ................... 169/16, 169/17, 19, 20, 21, 23, 56
See application file for complete search history.

(56) References Cited

U.S. PATENT DOCUMENTS

| | | | | | |
|---|---|---|---|---|---|
| 4,849,739 | A | * | 7/1989 | Loiacono | 340/620 |
| 5,439,028 | A | * | 8/1995 | Meyer et al. | 137/556 |
| 6,000,473 | A | * | 12/1999 | Reilly | 169/17 |
| 6,068,057 | A | * | 5/2000 | Beukema | 169/22 |
| 6,557,645 | B1 | * | 5/2003 | Ringer | 169/22 |

* cited by examiner

Primary Examiner—Len Tran
Assistant Examiner—Ryan Reis
(74) Attorney, Agent, or Firm—Lewis, Rice & Fingersh, L.C.

(57) ABSTRACT

A water column supervisory switch having a probe arrangement and probe circuitry for detecting the presence of a conductive medium that has reached a predetermined level above a clapper valve inside a dry pipe valve for a sprinkler system is disclosed. The probe arrangement comprises a housing and a probe operatively associated with probe circuitry that provides a means for activating an alarm when the conductive medium reaches the predetermined level in order for maintenance personnel to drain the water from the dry pipe valve.

11 Claims, 8 Drawing Sheets

WATER COLUMN SUPERVISORY SWITCH

CROSS REFERENCE TO RELATED APPLICATION

This application claims the benefit of U.S. Provisional Patent Application Ser. No. 60/678,853, filed on May 6, 2005, which is herein incorporated by reference.

FIELD

The present document relates to dry sprinkler and pre-action systems, and more particularly to a water column supervisory switch for dry sprinkler or pre-action systems.

SUMMARY

In one embodiment, a water column supervisory switch in combination with a sprinkler system may comprise a valve casing defining a chamber and a valve seat that divides the chamber into a upstream side in communication with a water supply and a downstream side in communication with a plurality of sprinklers, a clapper valve arrangement may include a clapper body adapted to engage the valve seat and being operable between a normally-closed position wherein fluid flow communication is prevented between the upstream and the downstream side, and a fully open position wherein fluid flow communication is permitted between the upstream and the downstream side, the chamber may be in communication with a conduit defined by a stack, and a probe arrangement operatively associated with the stack, the probe arrangement being positioned along the stack at a predetermined level relative to the clapper valve body, wherein an alarm is activated when a conductive medium contacts the probe arrangement at the predetermined level.

In another embodiment, a water column supervisory switch in combination with a sprinkler system may comprise a valve casing defining a chamber and a valve seat that divides the chamber into a upstream side in communication with a water supply and a downstream side in communication with a plurality of sprinklers, the valve casing houses a clapper valve arrangement that may include a clapper body adapted to engage the valve seat and being operable between a normally-closed position wherein fluid flow communication is prevented between the upstream and the downstream side, and a fully open position wherein fluid flow communication is permitted between the upstream side and the downstream side, and a probe arrangement operatively associated with a valve casing, the probe arrangement being positioned at a predetermined level along the valve casing relative to the clapper body, wherein an alarm is activated when a conductive medium contacts the probe arrangement at the predetermined level.

In yet another embodiment, a method of electronically detecting the presence of a conductive medium at a predetermined level within a valve casing may comprise:

a) introducing an electrical signal into the valve casing such that the electrical signal is present within the conductive medium inside the valve casing at the predetermined level, the electrical signal being transmitted through the conductive medium inside the valve casing according to a valve of electrical conductivity of the conductive medium;

b) providing a probe arrangement at the predetermined level for detecting the electrical signal;

c) detecting for the presence of the electrical signal within the conductive medium at the predetermined level; and d) activating an alarm in response to detecting the presence of the electrical signal within the conductive medium.

Implementation of the above embodiments may include one or more of the following features:

The probe arrangement includes a single probe.

The probe arrangement introduces an electrical signal through the stack and into the conductive medium which is detected when the conductive medium contacts the probe arrangement at the predetermined level.

The probe arrangement includes a probe for detecting the electrical signal in the conductive medium when the conductive medium contacts the probe.

The probe arrangement further includes a probe with the probe including a conductive threaded portion in conductive communication with the conductive medium through the stack for providing the electrical signal to the conductive medium.

The conductive threaded fitting is a brass bushing.

The electrical signal is a low level AC signal.

The probe arrangement further includes a probe circuitry with the probe circuitry includes a signal generator that shapes the electrical signal into a low level AC signal which is conducted through the conductive threaded portion and into the conductive medium.

The probe further includes a conductive electrode portion for detecting the electrical signal in the conductive medium.

The probe further includes an electrically insulating stand-off sleeve between the conductive electrode portion and the conductive threaded portion.

The probe circuitry further includes a conditioning circuit for converting the low level AC signal to a DC voltage level signal.

The probe circuitry further includes a threshold circuit with the threshold circuit comparing the DC voltage level signal against a predetermined threshold, wherein if the DC voltage level signal is greater than the predetermined threshold, the alarm is activated.

The single probe is in direct communication with the chamber.

The water column supervisory switch may further comprise pipe connection members with the probe arrangement being in fluid flow communication with the chamber through the pipe connection members.

The pipe connection members are positioned at the predetermined level.

Additional objectives, advantages and novel features will be set forth in the description which follows or will become apparent to those skilled in the art upon examination of the drawings and detailed description which follows.

DETAILED DESCRIPTION

Referring to the drawings, a water column supervisory switch is illustrated and generally indicated as 12 in FIGS. 1-6 for use with a sprinkler system 10. In one embodiment, sprinkler system 10 may be a dry sprinkler system, or in another embodiment a pre-action system.

The sprinkler system 10 may include an upstream "wet" side A that communicates with a water supply and a downstream "dry" pressurized side B that communicates with a plurality of sprinklers (not shown) that release forced water from the water supply when the sprinkler system 10 is activated. A dry pipe valve apparatus 16 may be interposed between the upstream and downstream sides A and B of the sprinkler system 10 and provides a means for selective fluid flow communication such that water from the upstream side A is prevented from entering the downstream side B until the sprinkler system 10 is activated.

Figures 2A, 6:
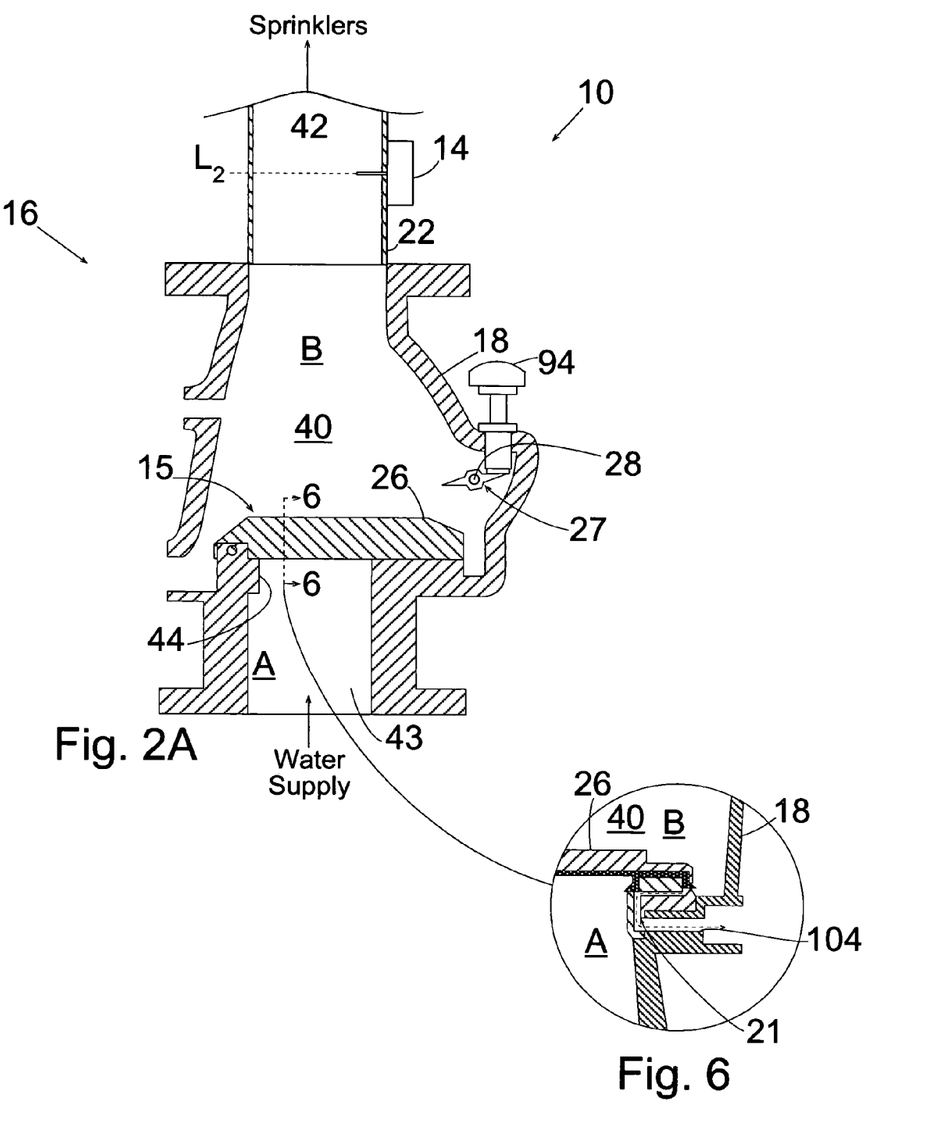
FIGS. 2A-2D are cross-sectional views of the dry pipe valve apparatus illustrating a sequence of positions of the clapper valve arrangement.
FIG. 6 is an enlarged view of FIG. 2A showing the intermediate chamber of the dry pipe valve apparatus.
Figure 2B:
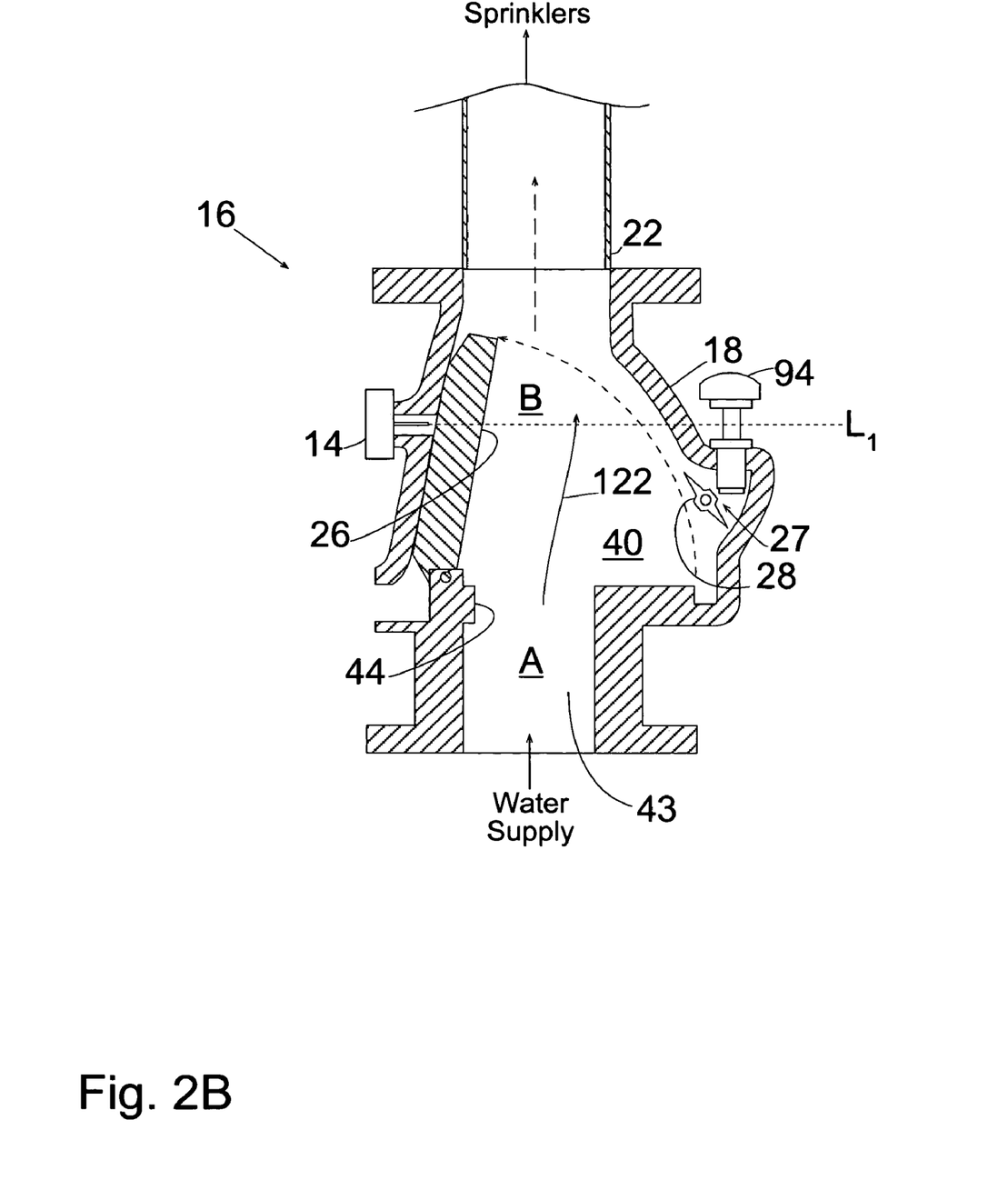

Referring to FIG. 2A, dry pipe valve apparatus 16 may include a valve casing 18 that defines a chamber 40 in communication with a conduit 42 defined by a stack 22 attached to valve casing 18. Dry pipe valve apparatus 16 may further include a clapper valve arrangement 15 disposed inside valve casing 18 having a clapper body 26 adapted to be seated against a valve seat 44 defining an opening 43 for permitting or preventing fluid flow through chamber 40 from the water supply.

Clapper body 26 may be operable between a normally-closed position (FIG. 2A), wherein fluid flow is prevented from entering the downstream side B through the opening 43 and a fully open position (FIG. 2B), wherein fluid flow is permitted between the upstream side A and downstream side B through opening 43 when the sprinkler system 10 is activated.

Referring to FIG. 6, an intermediate chamber 21 may be provided that is in selective fluid flow communication with chamber 40 when the clapper body 26 is in either the fully open or intermediate open positions. The intermediate chamber 21 may provide a means for draining water remaining in the chamber 40 after fluid flow from the water supply has sufficiently dissipated after activation of the sprinkler system 10.

Figure 2C:
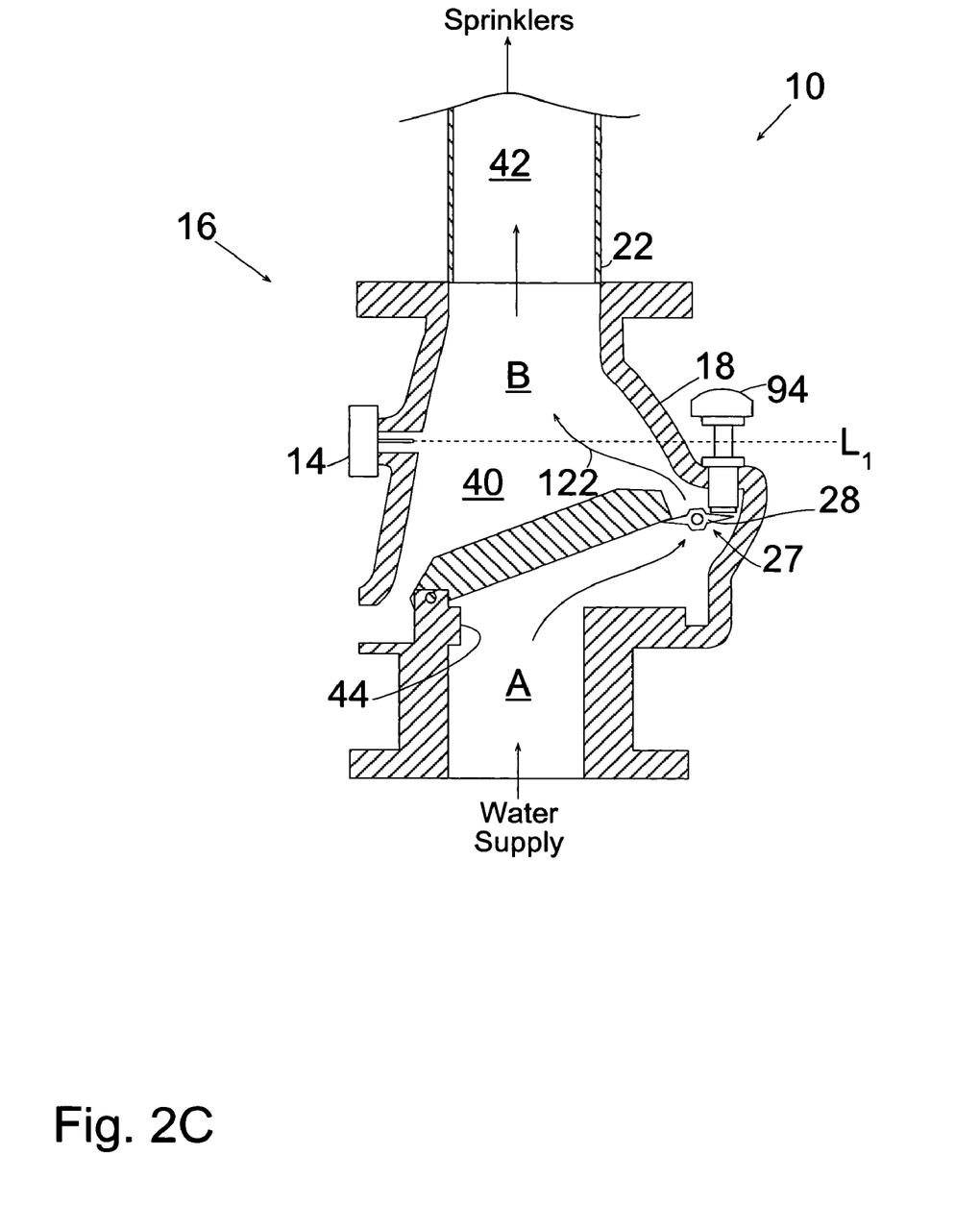

In one embodiment, as shown in FIG. 2C, the clapper body 26 may be engageable to a latch mechanism 27 that provides a means for maintaining the clapper valve arrangement 16 in an intermediate open position. This permits dissipating water to drain from chamber 40 after the sprinkler system 10 has been activated. The latch mechanism 27 may include a pivotable latch 28 that is adapted to engage clapper body 26 and maintain clapper valve arrangement 15 in the intermediate open position once fluid flow from the water supply has sufficiently dissipated. Dissipation of fluid flow permits the clapper body 26 to fall back against the latch mechanism 27 into the intermediate open position after being held in the fully open position by the on rush of water from the water supply.

This intermediate open position allows any water remaining in chamber 40 to drain from the valve casing 18 through the intermediate chamber 21 such that no residual water remains above the clapper body 26 after returning to the normally-closed position. An external reset device 94 may be in operative association with the latch mechanism 27 for releasing the clapper body 26 (shown in phantom) from the pivotable intermediate open position when activated by maintenance personnel.

Figure 2D:
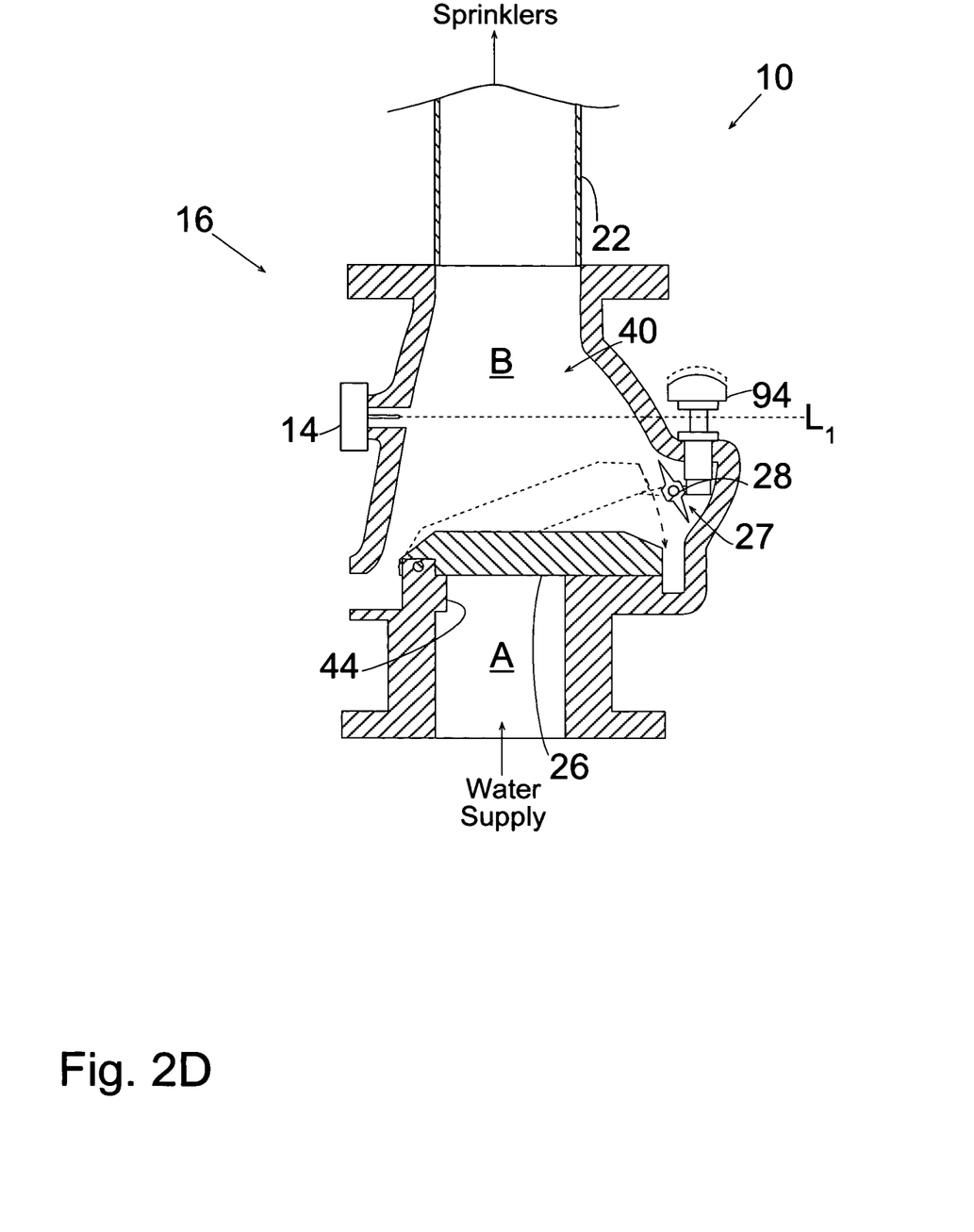

Once water has sufficiently drained from the sprinkler system 10, a user may actuate the external reset device 94 which releases the clapper body 26 (shown in phantom) from the latch 28 and reseats the clapper body 26 against the valve seat 44 in the normally-closed position (FIG. 2D). However, it is contemplated that the clapper valve arrangement 15 may operate without latch mechanism 27.

The clapper valve arrangement 15 may be maintained in the normally-closed position by a combination of the weight of the clapper body 26 against the valve seat 44 and the force applied by the pressurized air present in the downstream side B of the sprinkler system 10. In one embodiment, this combination provides a pressure head against the valve body 26 that has a pressure differential having a ratio of at least 6:1 relative to the opposing pressure head applied by the water supply on the upstream side A.

Typically, a 6:1 pressure differential between the pressure heads applied by the upstream side A and downstream side B is sufficient to maintain the clapper body 26 in the normally-closed position, although other pressure differentials sufficient to maintain the clapper valve arrangement 15 in the normally-closed position based on the pressure of the pressurized air, weight of the clapper body 26, and the size of the valve seat 44 are contemplated.

In operation, the sprinkler system 10 is activated when the pressurized air is released from the upstream side B, for example by one or more sprinkler heads (not shown) being activated, such that the weight of the clapper body 26 is overcome by the opposing pressure head applied by the water supply to the clapper body 26. As the pressure head applied by the upstream side A overcomes the pressure head applied by the downstream side B, the clapper body 26 is forced open and placed in the fully open position shown in FIG. 2B such that fluid flow 122 is initiated through chamber 40.

Once fluid flow 122 has dissipated sufficiently after activation of sprinkler system 10, the clapper body 26 moves from the open position to the intermediate open position (FIG. 2B) wherein the clapper body 26 becomes engaged to the latch 28 of latch mechanism 27. The intermediate open position maintained by the clapper body 26 permits residual fluid flow 104 from the chamber 40 to drain out through intermediate chamber 21 as illustrated in FIG. 6.

As noted above, after the sprinkler system 10 has been activated and the force of water from the water supply has sufficiently dissipated, the clapper body 26 being in the intermediate open position may be released by actuating external reset device 94 which causes latch 28 to pivot and release the clapper body 26 such that clapper body 26 re-seats against the valve seat 44 in the normally-closed position. Once the valve body 26 is re-seated, residual water still remaining on the downstream side B may become trapped above the clapper body 26, which must be manually drained from chamber 40 through auxiliary drain 102 of valve casing 18. This trapped water over the clapper body 26 can cause an increase in the pressure head applied against the clapper body 26 greater than a 6 to 1 differential which can prevent the clapper body 26 from being placed in the fully open position during activation of sprinkler system 10 due to the increased pressure head and cause the failure of the dry pipe valve apparatus 16.

In some instances, the pressurized air in the downstream side B may be relatively humid and can condense into water condensate that accumulates in chamber 40 directly on the clapper body 26. Accumulation of water over the clapper body 26 over time can also increase the pressure head applied by the downstream side B such that the 6:1 pressure differential between the two opposing pressure heads is increased to a pressure differential that would prevent the clapper valve arrangement 15 from being placed in the fully open position during activation of the sprinkler system 10.

To overcome these problems, sprinkler system 10 may include the water column supervisory switch 12 (FIG. 1) that activates an alarm 50 whenever the water over the clapper body 26 reaches a predetermined level $L_1$, $L_2$ or any other pre-determined level that contacts a probe arrangement 14 in communication with an area at some predetermined level above the clapper body 26.

Figure 5:
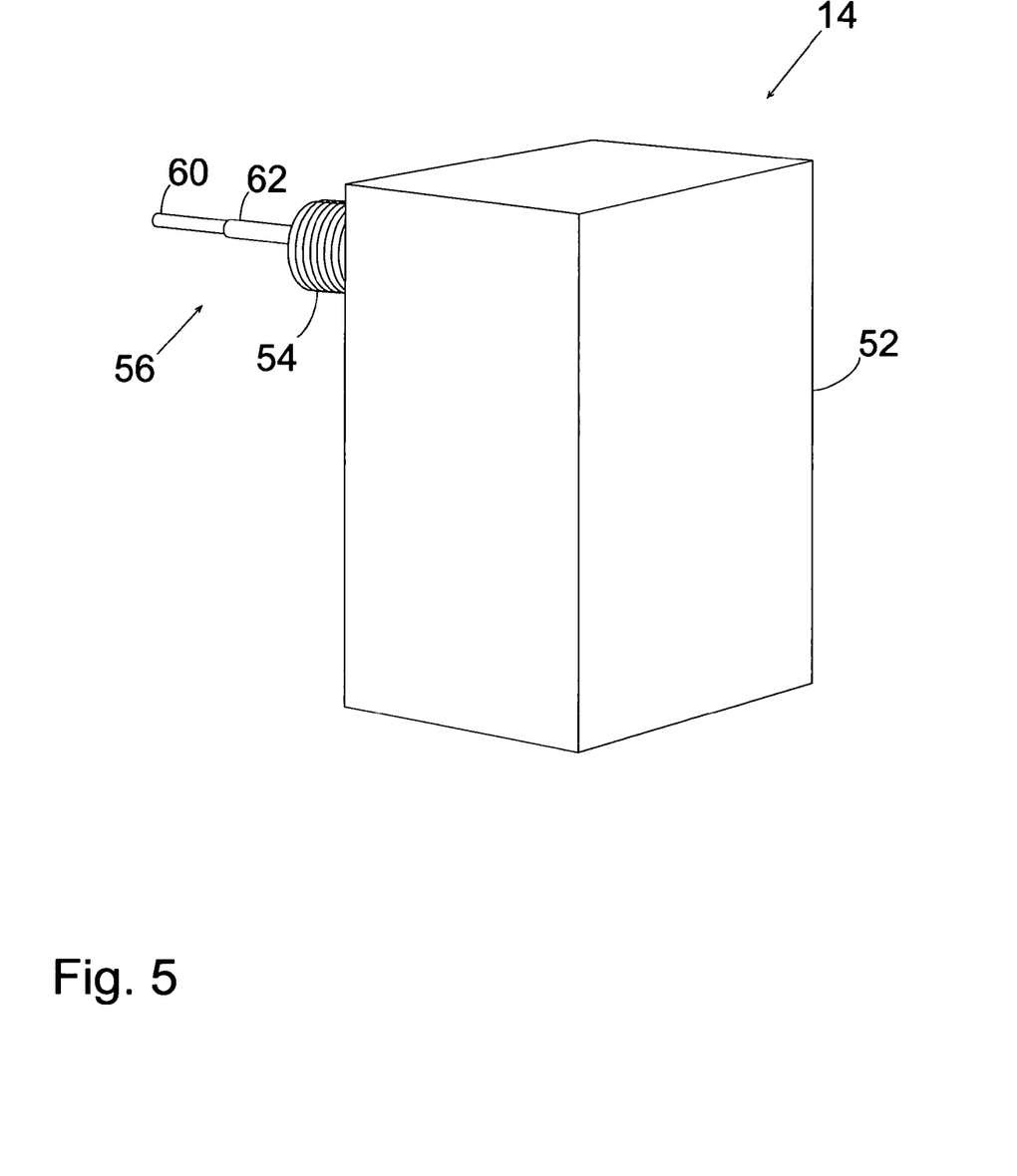
FIG. 5 is a perspective view of the probe arrangement.

Referring to FIG. 5, probe arrangement 14 may include a housing 52 and a conductive threaded portion 54 from which extends a single electrical probe 56 for detecting the presence of water about probe 56. In one embodiment, conductive threaded portion 54 define external threads that may be threaded through stack 22 which extends from the valve casing 18 or other suitable vessel wherein detection of the level of trapped water above clapper body 26 is desired. As further shown, probe 56 may be provided with a conductive electrode portion 60 for detecting an AC signal in the water generated by probe arrangement 14 and an electrically insulating stand-off sleeve 62 for providing an insulating portion between the conductive electrode portion 60 and the conductive threaded portion 54 of probe 56.

Figure 1:
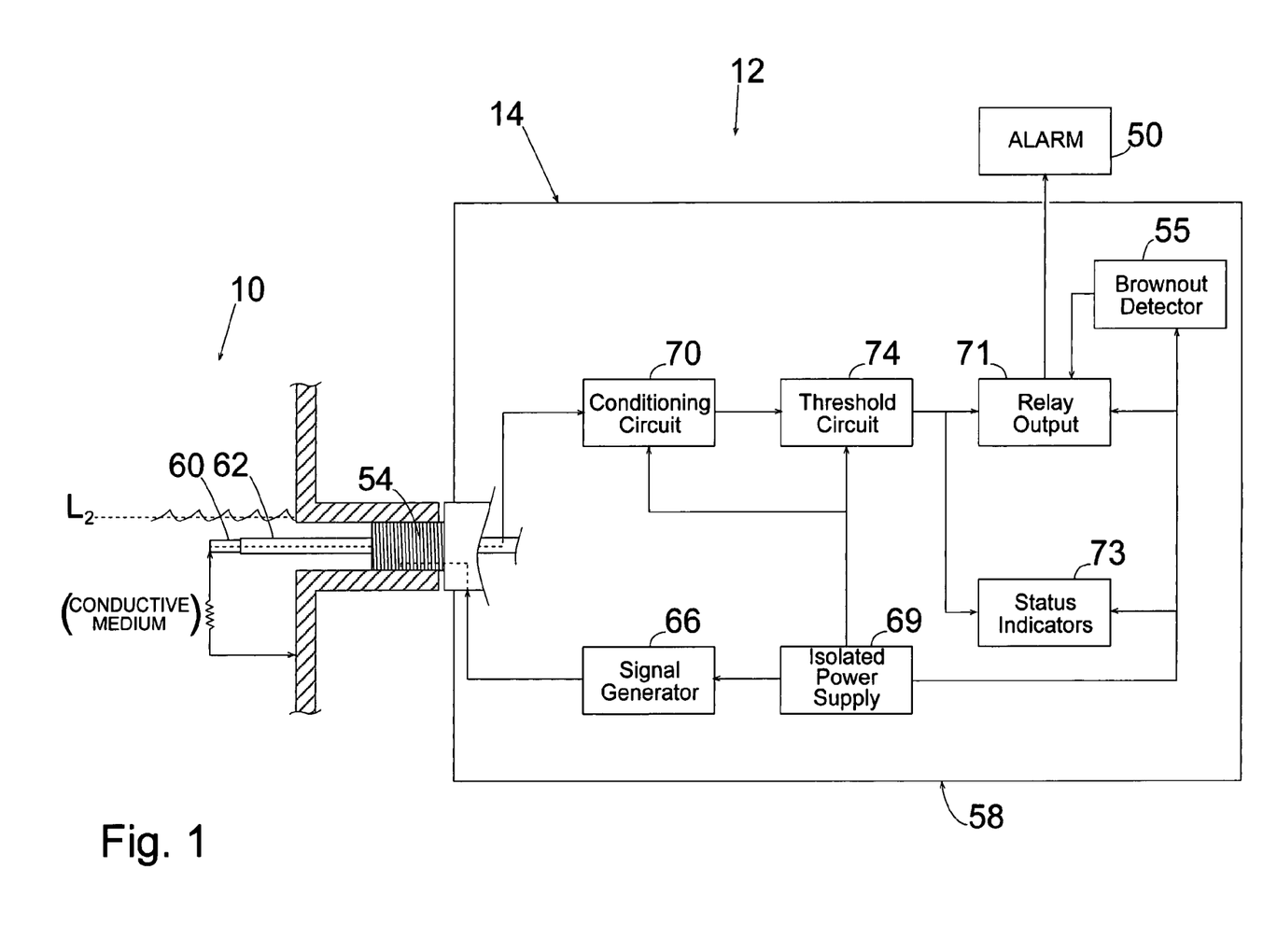
FIG. 1 is a simplified block diagram of the water column supervisory switch illustrating the basic components of the probe arrangement.

Referring back to FIG. 2A, in one embodiment stack 22 may define a conduit 42 such that trapped water that reaches or exceeds predetermined level $L_2$ above clapper body 26 inside the stack 22 will contact probe 56 and activate alarm 50. As shown in FIG. 1, probe arrangement 14 may include probe circuitry 58 inside housing 52, and is installed at predetermined level $L_2$ with the probe arrangement 14 operatively coupled to stack 22 such that conductive threaded portion 54 may establish a conductive pathway through stack 22.

Referring back to FIG. 1, probe circuitry 58 of the water column supervisory switch 12 may monitor the presence of an electrical signal in a conductive medium, such as water, between the probe 56 and the conductive threaded portion 54 when water reaches predetermined level $L_2$. In one embodiment, conductive threaded portion 54 is a brass bushing capable of conducting an electrical signal. In operation, an isolated power supply 69 of the probe circuitry 58 converts AC line voltage to a low level DC voltage used to power the probe circuitry 58.

Further, power supply 69 may also generate a low voltage AC signal that is shaped by a signal generator 66 and conducted through the conductive threaded portion 54 of probe arrangement 14 such that the low level AC signal is conducted through stack 22 and to any water present in conduit 42. When water reaches or exceeds predetermined level $L_2$ and contacts probe 56, the AC signal travels through the conductive medium of the water and is detected by the conductive electrode portion 60 of probe 56.

The detected low level AC signal may then be processed by a conditioning circuit 70 and converted into a DC voltage level signal. Threshold circuit 74 may then compare this DC voltage level signal against a predetermined threshold found in memory (not shown) in operative association with probe circuitry 58. If the predetermined threshold is reached, alarm 50 is activated through a relay output 71. At the same time, the on-board status indicator 73, such as an LED light or a sound alarm, may be activated to indicate an alarm condition. In the absence of water reaching the predetermined level $L_2$ that contacts the probe 56, the generated low level AC signal has no path from the conductive medium to be detected by the conductive electrode portion 60 of probe 56 such that alarm 50 could be activated.

As further shown, probe circuitry 58 may include a brownout detector 55 that receives power from the isolated power supply 69. Brownout detector 55 may be operatively associated with the relay output 71 and provides a means for monitoring supply voltage to the relay output 71 from the isolated power supply 69. If the supply voltage falls below a predetermined value, the brownout detector 55 detects the voltage drop and automatically switches the relay output 71 to a fault condition which is the same response given when the probe circuitry 58 detects the presence of the electrical signal in the conductive medium. The predetermined value of the supply voltage may be defined by the operating voltage at which the sensitivity of the probe circuitry 58 is set by the user.

Figure 3:
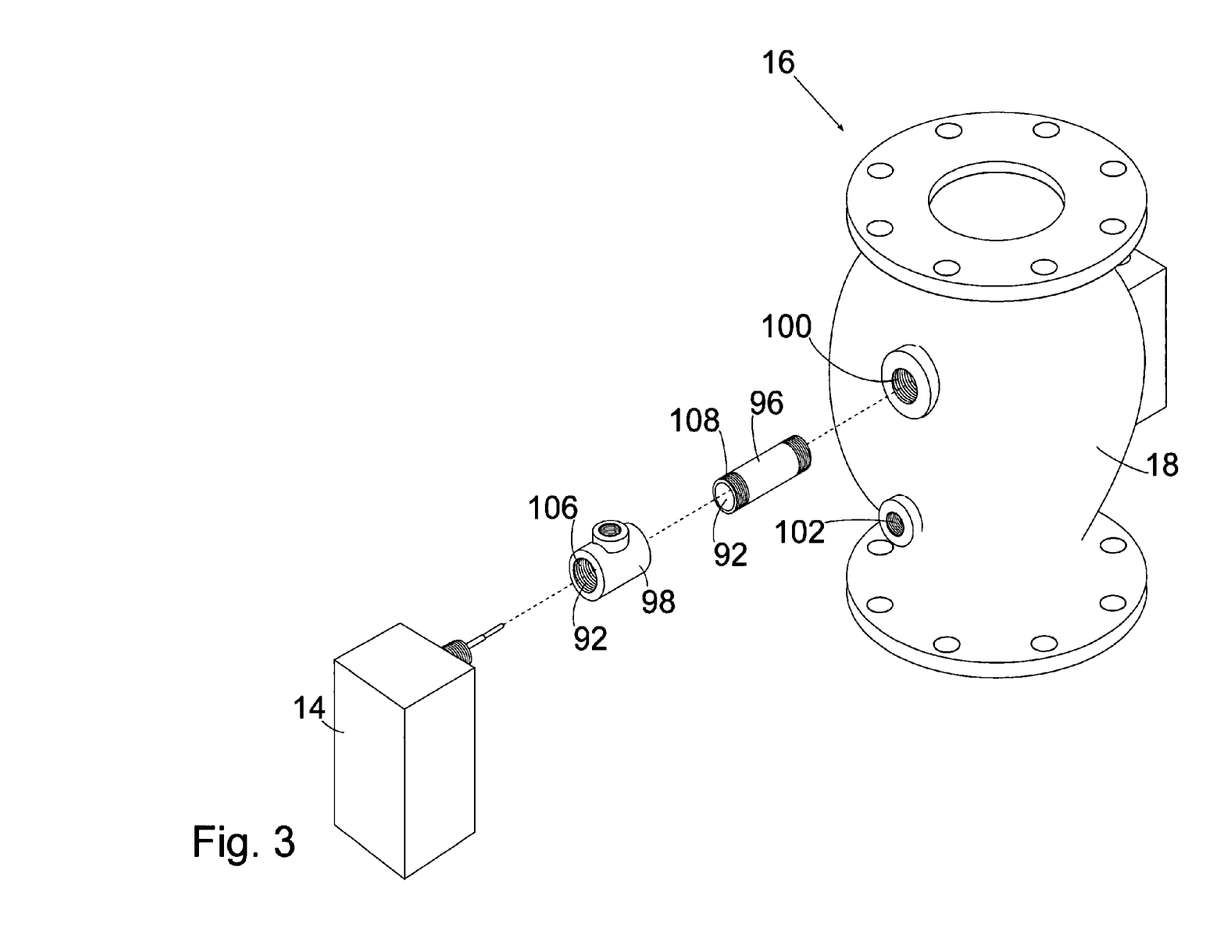
FIG. 3 is a partial exploded view of the dry pipe valve apparatus showing the probe arrangement.
Figure 4:
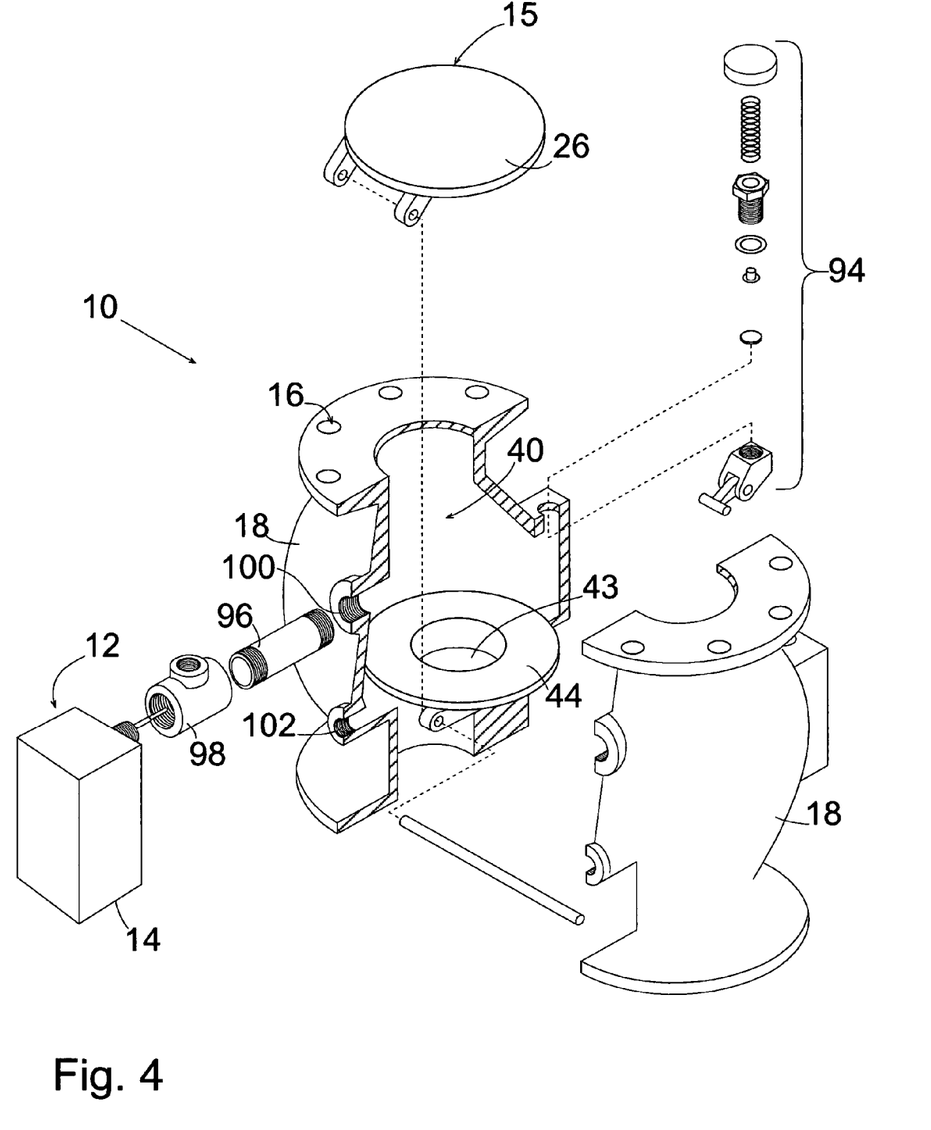
FIG. 4 is an exploded view of the dry pipe valve apparatus showing the clapper valve arrangement and probe arrangement for a sprinkler system.

In another embodiment, the probe arrangement 14 may be positioned such that the probe 56 may be in communication with the area of chamber 40 and directly engaged to either the valve casing 18 or pipe connection members in fluid flow communication with chamber 40 as shown in FIG. 3 at a predetermined level $L_1$ above clapper body 26. The valve casing 18 may include a port 100 adapted to engage a hollow nipple 96. A T-piece 98 may be adapted to secure probe arrangement 14 at one end and nipple 96 at the other end thereof such that a conduit 92 is defined that may permit probe 56 to be in fluid flow communicate with chamber 40.

Engagement of the probe arrangement 14 may be accomplished by securing the external threads 106 of threaded fitting 54 to the internal threads 108 of T-piece 98. The nipple 96 may then be engaged to port 100 at predetermined level $L_1$, such that water that reaches or exceeds predetermined level $L_1$ inside chamber 40, may flow through conduit 92 and contact probe 56 to activate alarm 50. In this particular embodiment, probe arrangement 14 positioned at predetermined level $L_1$ includes probe circuitry 58 and functions identically to the embodiment of probe arrangement 14 positioned at predetermined level $L_2$. However, it is contemplated that the probe arrangement 14 may be secured to any one of a number of conventional pipe connection members (not shown) located above the clapper body 26 along valve casing 18 that are in fluid flow communication with chamber 40 at other predetermined levels or locations in order to detect the presence of water that reaches such a predetermined level above the clapper body.

It should be understood from the foregoing that, while particular embodiments have been illustrated and described, various modifications can be made thereto without departing from the spirit and scope of the invention as will be apparent to those skilled in the art. Such changes and modifications are within the scope and teaching of this invention as defined in the claims appended hereto.

The invention claimed is:

1. A water column supervisory switch in combination with a sprinkler system comprising:
   a valve casing defining a chamber and a valve seat that divides the chamber into a upstream side in communication with a water supply and a downstream side in communication with a plurality of sprinklers,
   a clapper valve arrangement comprising a clapper body adapted to engage the valve seat and being operable between a normally-closed position wherein fluid flow communication is prevented between the upstream and the downstream side, and a fully open position wherein fluid flow communication is permitted between the upstream and the downstream side, the chamber being in communication with a conduit defined by a stack, and a probe arrangement operatively associated with the stack, the probe arrangement being positioned at a predetermined level along the stack relative to the clapper valve body, and including a probe; the probe including:
- a conductive threaded portion in conductive communication with a conductive medium through the stack for introducing an electrical signal through the stack and into the conductive medium;
- a conductive electrode portion for detecting the electrical signal in the conductive medium when the conductive medium contacts the probe arrangement at a predetermined level; and
- an electrically insulating stand-off sleeve between the conductive electrode portion and the conductive threaded portion wherein an alarm is activated when the conductive medium in the stack contacts the probe arrangement at the predetermined level.

2. The water column supervisory switch according to claim 1, wherein the probe arrangement includes only a single probe.

3. The water column supervisory switch according to claim 1, wherein said conductive threaded fitting is a brass bushing.

4. The water column supervisory switch according to claim 1, wherein said electrical signal is a low level AC signal.

5. A water column supervisory switch in combination with a sprinkler system comprising:
- a valve casing defining a chamber and a valve seat that divides the chamber into a upstream side in communication with a water supply and a downstream side in communication with a plurality of sprinklers,
- a clapper valve arrangement comprising a clapper body adapted to engage the valve seat and being operable between a normally-closed position wherein fluid flow communication is prevented between the upstream and the downstream side, and a fully open position wherein fluid flow communication is permitted between the upstream and the downstream side, the chamber being in communication with a conduit defined by a stack, and
- a probe arrangement operatively associated with the stack, the probe arrangement being positioned at a predetermined level along the stack relative to the clapper valve body, the probe arrangement including:
  - a probe; the probe including a conductive threaded portion in conductive communication with a conductive medium through the stack for introducing an electrical signal through the stack and into the conductive medium; and
  - a probe circuitry, said probe circuitry including:
    - a signal generator that shapes said electrical signal into a low level AC signal which is conducted through said conductive threaded portion and into said conductive medium; and
    - a conditioning circuit for converting said low level AC signal to a DC voltage level signal.

wherein an alarm is activated when the conductive medium in the stack contacts the probe arrangement at the predetermined level.

6. The water column supervisory switch according to claims 5, wherein said probe circuitry further includes a threshold circuit, said threshold circuit comparing the DC voltage level signal against a predetermined threshold, wherein if the DC voltage level signal is greater than said predetermined threshold, said alarm is activated.

7. The water column supervisory switch according to claim 5, wherein the probe arrangement includes only a single probe.

8. The water column supervisory switch according to claim 5, wherein the conductive threaded fitting is a brass bushing.

9. The water column supervisory switch according to claim 5, wherein the probe further includes a conductive electrode portion for detecting said electrical signal in said conductive medium.

10. The water column supervisory switch according to claim 9, wherein said probe further includes an electrically insulating stand-off sleeve between said conductive electrode portion and said conductive threaded portion.

11. The water column supervisory switch according to claim 1, wherein said probe arrangement further includes a probe circuitry, said probe circuitry includes a signal generator that shapes said electrical signal into a low level AC signal which is conducted through said conductive threaded portion and into said conductive medium.

* * * * *